(12) United States Patent
Dong et al.

(10) Patent No.: US 11,010,215 B2
(45) Date of Patent: May 18, 2021

(54) RECOMMENDING APPLICATIONS BASED ON CALL REQUESTS BETWEEN APPLICATIONS

(71) Applicant: BANMA ZHIXING NETWORK (HONGKONG) CO., LIMITED, Kowloon (HK)

(72) Inventors: Ping Dong, Hangzhou (CN); Bo Qiang, Hangzhou (CN)

(73) Assignee: BANMA ZHIXING NETWORK (HONGKONG) CO., LIMITED, Hong Kong (HK)

( * ) Notice: Subject to any disclaimer, the term of this patent is extended or adjusted under 35 U.S.C. 154(b) by 76 days.

(21) Appl. No.: 16/146,985

(22) Filed: Sep. 28, 2018

(65) Prior Publication Data

US 2019/0102237 A1 Apr. 4, 2019

Related U.S. Application Data

(63) Continuation-in-part of application No. PCT/CN2017/077916, filed on Mar. 23, 2017.

(30) Foreign Application Priority Data

Mar. 31, 2016 (CN) .......................... 201610201612.6

(51) Int. Cl.
*G06F 9/54* (2006.01)
*G06Q 30/06* (2012.01)
(Continued)

(52) U.S. Cl.
CPC ................ *G06F 9/547* (2013.01); *G06F 8/61* (2013.01); *G06F 11/34* (2013.01);
(Continued)

(58) Field of Classification Search
None
See application file for complete search history.

(56) References Cited

U.S. PATENT DOCUMENTS 9,141,444 B2 9/2015 Partridge
2010/0281488 A1* 11/2010 Krishnamurthy ... G06F 11/3495
718/106

(Continued)

FOREIGN PATENT DOCUMENTS

| CN | 104424023 | 3/2015 |
|---|---|---|
| CN | 104808983 | 7/2015 |

(Continued)

*Primary Examiner* — Shih-Wei Kraft
(74) *Attorney, Agent, or Firm* — Van Pelt, Yi & James LLP

(57) ABSTRACT

Recommending applications based on call requests between applications is disclosed, including: receiving a plurality of sets of application call request recordings from respective ones of a plurality of client devices; using the plurality of sets of application call request recordings to generate association relationships between a first application and one or more other applications; determining a set of application recommendation information determined based at least in part on the association relationships between the first application and the one or more other applications; and sending the set of application recommendation information to a recipient client device.

11 Claims, 10 Drawing Sheets

(51) Int. Cl.
*H04L 29/08* (2006.01)
*G06F 11/34* (2006.01)
*G06F 8/61* (2018.01)

(52) U.S. Cl.
CPC ......... *G06Q 30/0631* (2013.01); *H04L 67/02* (2013.01); *H04L 67/22* (2013.01); *H04L 67/26* (2013.01)

(56) References Cited

U.S. PATENT DOCUMENTS

| | | | |
|---|---|---|---|
| 2010/0306762 A1* | 12/2010 | Lindberg | G06F 8/61 717/176 |
| 2011/0078203 A1* | 3/2011 | Cohen | G06F 9/451 707/793 |
| 2011/0252114 A1* | 10/2011 | Okuyama | G06F 8/60 709/217 |
| 2012/0072283 A1 | 3/2012 | Devore | |
| 2012/0260135 A1* | 10/2012 | Beck | G06F 11/323 714/45 |
| 2013/0124606 A1 | 5/2013 | Carpenter | |
| 2014/0114901 A1 | 4/2014 | Pradhan | |
| 2014/0173625 A1 | 6/2014 | Kumar | |
| 2015/0074106 A1 | 3/2015 | Ji | |
| 2016/0092768 A1 | 3/2016 | Patil | |

FOREIGN PATENT DOCUMENTS

| | | |
|---|---|---|
| CN | 104915224 | 9/2015 |
| CN | 105184160 | 12/2015 |

* cited by examiner

RECOMMENDING APPLICATIONS BASED ON CALL REQUESTS BETWEEN APPLICATIONS

CROSS REFERENCE TO OTHER APPLICATIONS

This application is a continuation-in-part of and claims priority to International (PCT) Application No. PCT/CN2017/77916 entitled METHOD AND DEVICE FOR DETERMINING AND APPLYING ASSOCIATION RELATIONSHIP BETWEEN APPLICATION PROGRAMS filed Mar. 23, 2017 which is incorporated herein by reference in its entirety for all purposes, which claims priority to China Patent Application No. 201610201612.6 entitled METHOD AND MEANS FOR DETERMINING AND UTILIZING RELATIONSHIPS AND ASSOCIATIONS BETWEEN APPS filed on Mar. 31, 2016 which is incorporated by reference in its entirety for all purposes.

FIELD OF THE INVENTION

The present invention relates to application technology. In particular, the present application relates to techniques for determining and utilizing association relationships between different applications.

BACKGROUND OF THE INVENTION

With the rapid development of mobile communication technology and the arrival of the mobile media age, the mobile phone has become an essential mobile communication tool. Once simply a means of making telephone calls, the mobile phone has become increasingly smart and has evolved into a mobile platform for collecting and processing personal information. With the help of operating systems and a wide array of application software, the smart phone has become a mobile terminal.

The current approach to recommending applications mainly consists of a "related application" recommendation function, whereby similar applications are provided for some applications in an application store for downloading applications.

However, the correlations between applications in the existing approach to application recommendation are generally static. That is, the application store analyzes inter-application correlations based on static information, such as, for example, application classification or application developer, which is provided by the applications.

However, static correlations are preconfigured and do not necessarily reflect the relationships between applications when they are in use. Therefore, static correlations cause the current approach to application recommendation to be less useful because of how correlations between applications might change over time.

SUMMARY OF THE INVENTION

Embodiments described herein improve application recommendations by analyzing recordings of call requests made by applications to each other while they are in use.

The present application discloses techniques comprising:
Receiving a plurality of sets of application call request recordings from respective ones of a plurality of client devices;

Using the plurality of sets of application call request recordings to generate association relationships between a first application and one or more other applications;

Determining a set of application recommendation information determined based at least in part on the association relationships between the first application and the one or more other applications; and Sending the set of application recommendation information to a recipient client device.

By analyzing call requests made between applications executing on at least one client device, the dynamic associations between applications that are used by users may be determined and used to determine applications to recommend to a client device. As such, the application recommendations that are generated are more relevant and current for users.

BRIEF DESCRIPTION OF THE DRAWINGS

Various embodiments of the invention are disclosed in the following detailed description and the accompanying drawings.

DETAILED DESCRIPTION

Figure 1:
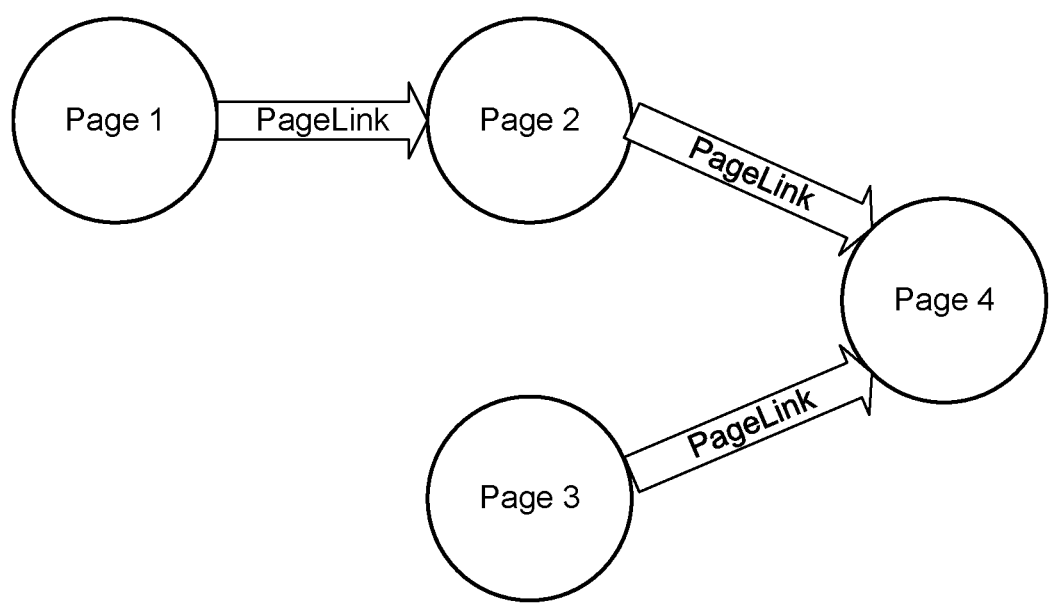
FIG. 1 shows examples of call requests between various applications.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of recommending applications based on call requests between applications are described herein. A plurality of sets of application call request recordings is received from respective ones of a plurality of client devices. In various embodiments, an "application call request" comprises a call request made by one application to another application during the execution of the calling application. In various embodiments, the application call request identifies the source application that sent the call request, the target application that is called by the call request, data to be passed from the source application to the target application, and a name associated with an event. In various embodiments, an "application call request recording" comprises information pertaining to the application call request and includes at least the identifier associated with the application that had made the call request and also the identifier that had been called by the former application. The plurality of sets of application call request recordings is used to generate association relationships between a first application and one or more other applications. A set of application recommendation information is determined based at least in part on the association relationships between the first application and the one or more other applications. The set of application recommendation information is sent to a recipient client device.

A cloud OS may also be called a cloud operating system or a computing-based operating system for the cloud or a computing center-based operating system for the cloud. In various embodiments, a "cloud OS" refers to an operating system executing at a client device and which relies on the capabilities of a cloud platform. For example, a cloud platform comprises cloud computing and cloud storage technology where one or more pools of computing resources are shared to provide computing, storage, and other services. Examples of cloud platforms include cloud computing background data centers. For example, the cloud computing background data center refers to a cloud platform integrated management system that manages vast amounts of hardware and software resources and that is built upon servers, storage devices, networks, and other underlying hardware resources and on single-device operating systems, middleware, databases, and other underlying software.

An example of a cloud OS is Alibaba's® YunOS. YunOS is an operating system that runs in data centers and on mobile terminals and that has fundamental Internet services, including map, mailbox, and search services. The YunOS framework packages web technology, including HTML5 and the computer language JavaScript. The YunOS framework also includes background cloud services and application engines for mobile terminal run environments.

In various embodiments, call requests made between different applications are recorded and used to determine related applications that are the basis for application recommendations. In some embodiments, the processes described below may be implemented with client devices on which a cloud OS such as YunOS is executing.

For purposes of illustration, application management schemes based on the YunOS are used as examples to describe various embodiments below. The following are some example application management terms based on the YunOS that are referred to in examples described hereinafter:

(1) Page

In YunOS, "Page" is an abstraction of local service and remote service, i.e., the basic unit of service. "Page" is also called a "service" or an "application." By packaging data and methods, a Page can provide various kinds of services. A service context may include multiple Pages. For example, a Page could be a UI (user interface) or a picture-taking or other service. A Page could also be a background service, such as account authentication. A running Page is called a Page instance. A Page instance is a running carrier for a local service or a remote service. A Page instance can be created (for example, after receiving a PageLink to Page B sent by Page A, Dynamic Page Manager Service (DPMS) can create an instance of Page B), scheduled, or managed by DPMS. DPMS can maintain the life cycle of the Page instance. DPMS is one of the system services of YunOS for Page management. DPMS runs in the pagemanagerd process. There are two services in pagemanagerd of YunOS:

SPMS (Static Page Manager Service), which is configured to manage Page resources and also install/uninstall/update applications.

DPMS (Dynamic Page Manager Service), which is configured to manage page runtime instances, including to create/suspend/resume/stop Page instances and other page lifecycle events.

Applications in the operating system may be published in the active directory, and thus, it is possible to encourage service-centered management and use. The applications generally may provide users with some functions locally and/or via the Web. Example applications include client/server applications and Web server, database server, and other server-based applications. Benefiting from YunOS's built-in WebEngine, Pages provide good support to Web pages and Web applications. Also, remote services may be implemented via Pages.

Each Page can be uniquely identified within YunOS. For example, a Uniform Resource Identifier (URI) can be used to uniquely identify a Page. Page can also be identified using a unique ID such as its corresponding URI. A URI may be considered as an address link. URIs can be generated in various ways so long as their uniqueness can be assured. The present application does not impose any limitations as to how URIs are generated.

Events and/or data can be transmitted between Pages via call requests, such as, for example, PageLinks, as will be described below. A Page can interact with a user via a user interface (UI) to provide service to the user.

With a URI, it is possible to uniquely determine a corresponding Page. For example, to distinguish a service that is provided by a Page, the URI assigned to the Page may selectively include relevant information on the service associated with Page, such as one or more of the following:

service title, service content, and service provider. For example, Company A provides a calendar service. The Page corresponding thereto may be assigned the URI as follows:

Page://calendar.a.com

In the above, "Page://" is used to distinguish this address as the address corresponding to a Page and to differentiate it from other types of addresses; "calendar" indicates the title of the service provided; "a" indicates the provider of this service.

(2) PageLink

In YunOS, PageLink is an information entity that flows between Pages. PageLink can transmit information such as events and/or data between Pages. Specific transmission of data may use a set Application Programming Interface (API). In some embodiments, PageLinks may be used as the basis for recording association relationships between applications. A PageLink may designate the URI of the target Page and may contain one or more types of information, including event, data, service, and other information.

In YunOS, Pages can be more flexibly achieved and provide a wide array of services with the use of PageLinks.

FIG. 1 shows examples of call requests between various applications.

In various embodiments, the application call request identifies the source application that sent the call request, the target application that is called by the call request, data to be passed from the source application to the target application, and a name associated with an event. In some embodiments, call requests between various applications (Pages) are achieved through using PageLinks. As shown in the example of FIG. 1, Page 1 calls Page 2 using a corresponding PageLink, and Page 2 and Page 3 each calls Page 4 using respective corresponding PageLinks. Table 1, below, shows an example data structure associated with a PageLink:

TABLE 1

| URI: target Page URI |
| Data: String |
| Options: Option |
| EventName: String |
| Referrer: source Page URI |

In reference to Table 1, "URI" represents the target Page ID (e.g., address/URI); "Data" represents the data, generally in JSON format, sent from the source Page to the target Page; "Options" represents some option parameters and is set aside for future expansion; "EventName" represents the name of the event; and "Referrer" represents the source page ID (e.g., address/URI).

All of the above fields, with the exception of Referrer, are designated by the calling party (e.g., the source Page/application) when sending a call request to a target Page, and the Referrer field is filled in automatically by the YunOS 4.0 system framework.

In various embodiments, an instance of an application call request from a source Page to a target Page can be implemented as a PageLink with a data structure such as the data structure shown in Table 1. In various embodiments and as will be described in further detail below, each call request from a source Page to a target Page at a client device is recorded and used to provide application recommendations.

Figure 2:
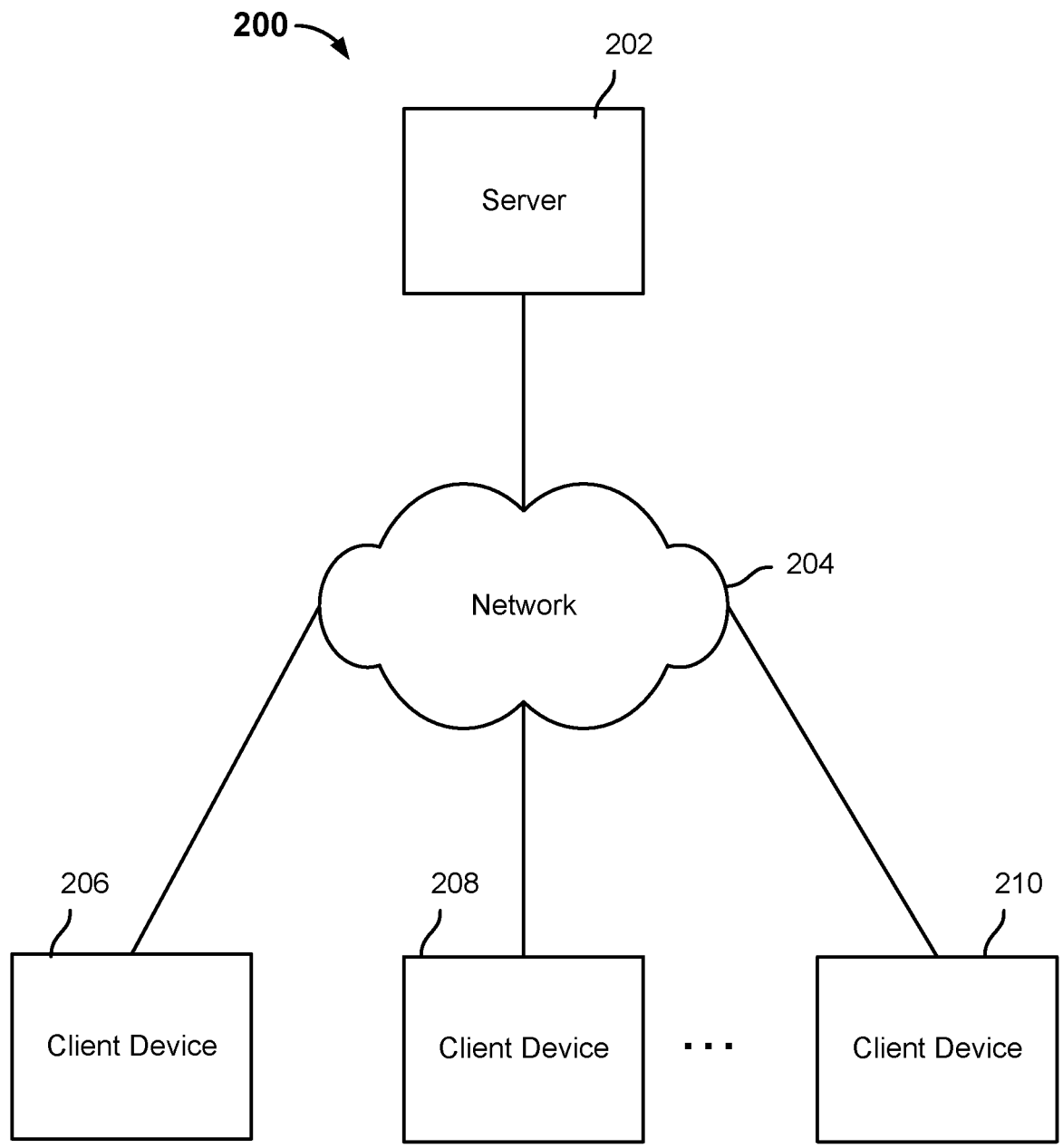
FIG. 2 is a diagram showing an embodiment of a system for recommending applications based on call requests between applications.

FIG. 2 is a diagram showing an embodiment of a system for recommending applications based on call requests between applications. System 200 includes server 202, network 204, and client devices 206, 208, and 210. Network 204 may comprise high-speed data networks and/or telecommunication networks (e.g., a wide area network, a local area network, the internet, or the internet using mobile communication technology). Each of server 202 and client devices 206, 208, and 210 communicate to each other over network 204.

Each of client devices 206, 208, and 210 may be a mobile device, a mobile telephone, a personal digital assistant (PDA), a handheld computer, a personal computer, a wearable device, or any other type of computing device. Each of client devices 206, 208, and 210 is configured with various applications (e.g., Pages) and a cloud OS (e.g., YunOS). Each of client devices 206, 208, and 210 is configured to detect instances of application call requests that are performed locally. In various embodiments, an instance of an application call request is implemented using a PageLink that is configured to pass information from a source application (Page) to the target application (Page). The source application is also sometimes referred to as the "calling party" and the target application is also sometimes referred to as the "called party." In various embodiments, an instance of an application call request identifies at least the relevant source Page ID (e.g., URI) and the relevant target Page ID (e.g., URI). Each of client devices 206, 208, and 210 is configured to generate a recording corresponding to each detected instance of a locally performed application call request, including the relevant source Page ID (e.g., URI) and the relevant target Page ID (e.g., URI).

For example, Application X is user initiated to execute at client device 206. During the execution of Application X, Application X may send call requests based on a user selection of a control that is presented within Application X and/or automatically through a subprogram that is running within Application X. Each call request that is generated and sent by Application X to a target application is logged as an application call request recording by client device 206. As Application X is updated (e.g., its computer code is updated), Application X may be configured to generate different call requests based on the updated computer code and/or the user interaction. Therefore, as users initiate different applications and interact with them at their client devices, the call requests generated by the executing applications are recorded at the client devices. Such call requests represent the users' application use habits and also the dynamic correlation/call relationships between different applications and therefore provide a current and accurate source for determining application recommendations to the users at their client devices.

In various embodiments, each of client devices 206, 208, and 210 is configured to send its respective set of application call request recordings to server 202. After receiving the set of application call request recordings from each of client devices 206, 208, and 210, server 202 is configured to determine inter-application association relationships between different applications (Pages) based on the collected sets of application call request recordings. For example, association relationships between different applications (Pages) may indicate that Application X has association relationships with Applications Y and Z (and/or to the degree each Application X has association relationships to Applications Y and Z).

Server 202 may use the generated association relationships to recommend applications to be installed at each of client devices 206, 208, and 210. Server 202 can then send identifying information (e.g., URIs) of the recommended applications to a client device. Each of the client devices 206, 208, and 210 can then present identifying information associated with applications that are recommended to be downloaded to the client devices for the respective user to consider. A recommended application may also be presented with a control that, when selected, causes the application to be downloaded to the client device. In some embodiments, if a recommended application is already installed at the client device, the client device can preload that application when a certain condition is satisfied (e.g., when an application with which it has an association relationship that meets a set threshold is initiated by the user at the client device).

In some embodiments, each of client devices 206, 208, and 210 is configured to generate association relationships between applications locally. For example, a client device may use its locally generated set of application call request recordings and/or in combination with a set of application call request recordings that is received from another client device to generate association relationships. Then, the client device may use the locally generated association relationships to determine applications to recommend to its corresponding user and/or to send to another client device for the other client device to determine applications to recommend to its corresponding user.

Figure 3:
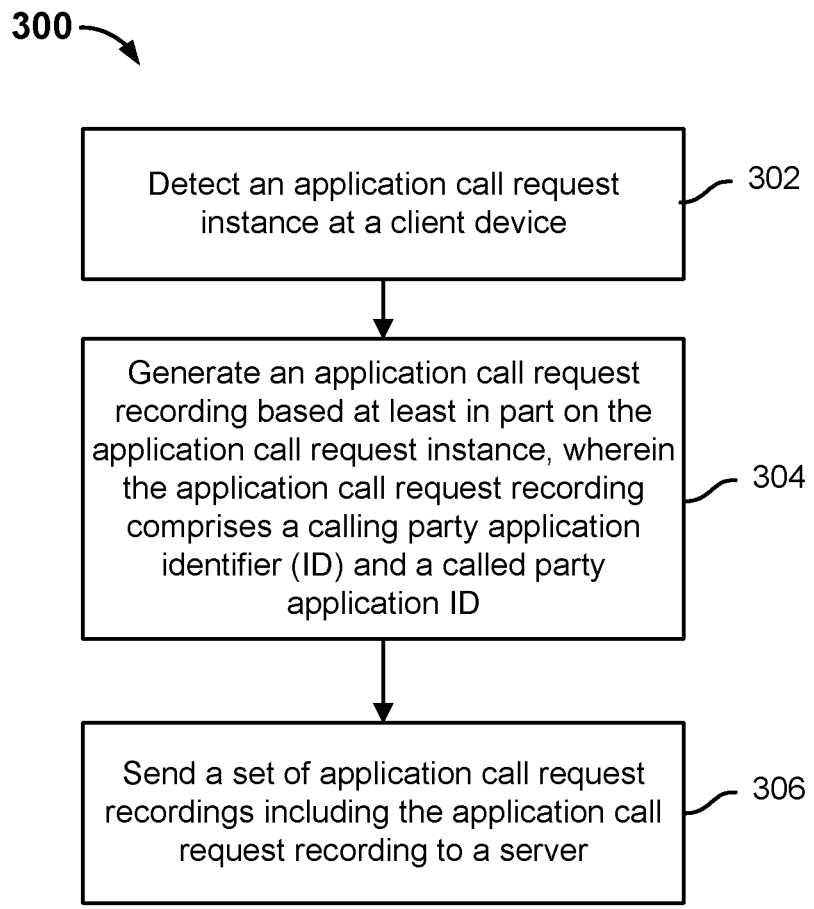
FIG. 3 is a flow diagram showing an embodiment of recording call requests between applications.

FIG. 3 is a flow diagram showing an embodiment of recording call requests between applications. In some embodiments, process 300 may be implemented at least in part by one or more of client devices 206, 208, and 210 of FIG. 2.

At 302, an application call request instance is detected at a client device.

At 304, an application call request recording is generated based at least in part on the application call request instance, wherein the application call request recording comprises a calling party application identifier (ID) and a called party application ID.

In various embodiments, call requests (e.g., PageLinks) sent locally from one application (Page) to another application (Page) are used to determine the associations between different applications. Each call request includes an identifier (ID) (e.g., URI) of the calling party and an identifier (ID) (e.g., URI) of the called party. Then, an application call request recording between two applications may be generated in correspondence with each call request.

For example, a PageLink is a dynamic command that is sent within a client device when a first Page (application) needs to call another Page (application). A PageLink may be triggered by a user selection of a control/button that is presented within a source Page. Or a PageLink may be triggered by a background service that is executing for a source Page. A PageLink sent by source Page X to transmit data to and/or cause target Page Y to open will be received by a component (e.g., the DPMS) of the operating system and then the component will cause the application of target Page Y to be launched at the client device. If the application of target Page Y is not already installed at the client device, then the component of the operating system will instead open the web browser and open a web page associated with target Page Y. If the PageLink included data to send to target Page Y, then the data may be passed to the application of Page Y or the web page associated with Page Y (if the application associated with Page Y is not installed at the client device).

The following is a specific example of how a PageLink that is sent from a source Page (PageA) to a target Page (PageB) is handled:
Step 1: PageA creates a new PageLink of PageB.
Source Code Example:

```
var PageLink = require("yunos/page/PageLink");
var link = new PageLink("page://demo. yunos.com/PageB");
var message = {title: "greeting", body: "hello world"};
link.data = JSON.stringify(message);
Step 2: PageA sends out the PageLink.
```

Source Code Example:

```
var Page = require("yunos/page/Page");
Page.getInstance( ).sendLink(link);
```

Step 3: System will send the PageLink information to DPMS (e.g., using the inter-process communication protocol (IPC)).
PageA instance is IPC Client and DPMS is IPC Server.
Step 4: DPMS handles the PageLink message.
If PageB is already running, then DPMS sends PageLink to existing PageB.
If PageB is not running, then DPMS creates a new process environment for PageB. Then after the PageB instance is ready, DPMS sends the PageLink to PageB.
Step 5: PageB receives the PageLink information.
Source Code Example:

```
class PageB extends Page {
    onLink(link) {
        var data = JSON.parse(link.data);
    }
}
```

For example, to use the example of PageLink as the call request, a PageLink must at least include the calling party ID (e.g., the source Page URI) and the called party ID (e.g., the target Page URI). Furthermore, the PageLink may also include the event name and one or any combination of transmitted data or configuration parameters. Optionally, the PageLink may include all of the information described above for Table 1. While the system is running, for example, the core framework layer in a client device dynamically records each application call request based on its use situation. The recorded data includes at least the following: the URI of the source Page (i.e., application) that sent the call request and the URI of the target Page that received the call request. Table 2, below, includes some examples of some application call request recordings:

TABLE 2

| Calling Party (Source Page ID) | Called Party (Target Page ID) |
|---|---|
| URI of Page 1 | URI of Page 2 |
| URI of Page 2 | URI of Page 4 |
| URI of Page 3 | URI of Page 4 |

One example of a Page ID is the Page's URI. However, identifying information other than a Page's URI may be used to serve as the Page's ID. Other examples of IDs include Page application IDs, serial numbers, and so on.

At 306, a set of application call request recordings including the application call request recording is sent to a server.

The set of application call request recordings that is generated at a client device is configured to be sent to a server. In some embodiments, as more application call requests are recorded at the client device, the updated set of application call request recordings is periodically sent to the server. In some embodiments, the current set of application call request recordings is sent to the server in response to a synchronization instruction that is periodically sent from the server.

Figure 4:
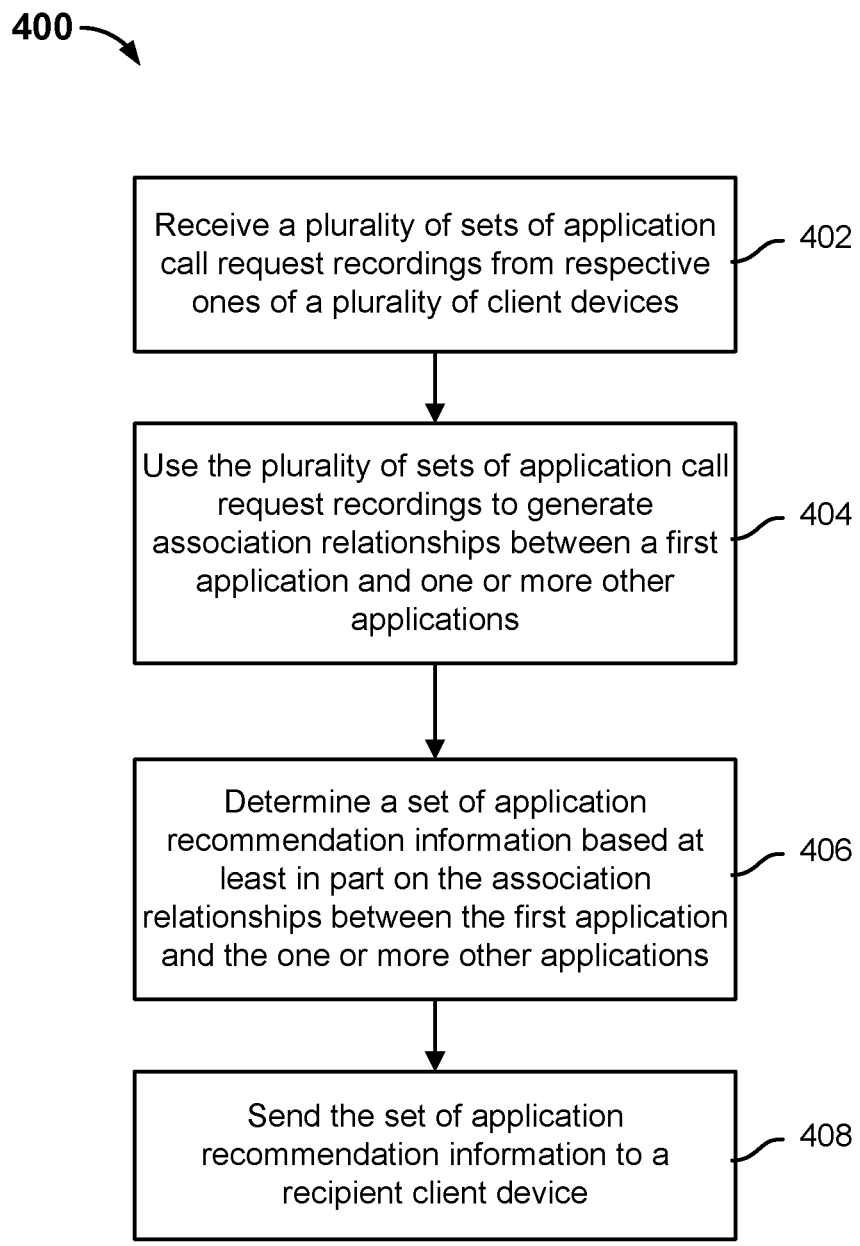
FIG. 4 is a flow diagram showing an embodiment of a process for recommending applications based on call requests between applications.

FIG. 4 is a flow diagram showing an embodiment of a process for recommending applications based on call requests between applications. In some embodiments, process 400 may be implemented at least in part by server 202 of FIG. 2.

At 402, a plurality of sets of application call request recordings is received from respective ones of a plurality of client devices.

A corresponding set of application call request recordings is received from each of one or more client devices. For example, a set of application call request recordings is generated at a client device using a process such as process 300 of FIG. 3. For example, each set of application call request recordings includes multiple application call request recordings. Examples of application call request recordings are shown in Table 2, above.

In some embodiments, it is possible for the server to receive only application call request recordings from one client device in order to customize the application recommendation to only the user of that client device. However, for purposes of illustration, it is assumed that the server receives sets of application call request recordings from multiple client devices.

The following are three example approaches that can be used to receive application call request recordings from client devices at the server:

First approach: Each client device sends its corresponding set of application call request recordings to the server at every first time interval. For example, the length of the first time interval may be negotiated in advance between the server and the client device or it may be predetermined.

Second approach: The server separately sends a report instruction to each client device in accordance with a set second time interval and in response, receives the application call relationship set reported by each client device. In this second approach, when the server's own (e.g., traffic or processing) status is relatively good (e.g., resulting in the server having more resources and/or bandwidth), it may actively request that each client device report its respective set of application call request recordings and then complete data synchronization.

Third approach: After receiving a high-level instruction, the server sends a report instruction separately to each client device and in response, receives the application call relationship set reported by each client device. Thus, whenever the administrator finds it necessary to conduct data synchronization, the high-level instruction may be sent to the server so that the server may request each client device to report its own application call relationship set and thus complete data synchronization.

The first, second, and third approaches may be used alone or in combination to obtain application call request recordings from the client devices.

At 404, the plurality of sets of application call request recordings is used to generate association relationships between a first application and one or more other applications.

After receiving corresponding sets of application call request recordings from multiple client devices, the server needs to merge the sets of application call request recordings that it had received and determine inter-application association relationships based on the merged sets of application call request recordings.

The following are example techniques by which merged sets of application call request recordings may be used by a server to determine an association relationship between one application ("Application X") and any other application ("Application A"):

First technique: The merged sets of application call request recordings is used as a basis to obtain a total number of times that Application X served as the calling party for any other Application and to obtain a total number of times that Application X served as the calling party to called Application A, specifically. Then, the association relationship between Application X and Application A is determined based on the ratio of the total number of times that Application X served as the calling party for calling Application A to the total number of times that Application X served as the calling party for any other application.

In some embodiments, the ratio of the total number of times that Application X served as the calling party for calling Application A to the total number of times that Application X served as the calling party for any other application, which is a percentage, may be directly regarded as an association relationship from Application X to Application A. The ratio value may also be multiplied by a set coefficient and then that product may be regarded as the association relationship from Application X to Application A.

Thus, it is possible to use the number of times that Application X actively calls other applications as the benchmark for determining the association relationships between Application X and each other application.

Second technique: The merged sets of application call request recordings is used as a basis to obtain a total number of times that Application X served as the called party by any other application and to obtain a total number of times that Application A has served as the calling party that had called Application X, specifically. Then, the association relationship between Application X and Application A is determined based on the ratio of the total number of times that Application A has served as the calling party that had called Application X to the total number of times that Application X served as the called party by any other application.

In some embodiments, the total number of times that Application A has served as the calling party that had called Application X to the total number of times that Application X served as the called party by any other application, which is a percentage, may be directly regarded as an association relationship from Application X to Application A. The ratio value may also be multiplied by a set coefficient and then that product may be regarded as the association relationship from Application X to Application A.

Thus, it is possible to use the number of times that Application X is actively called by other applications as the benchmark for determining the association relationships between Application X and each other application.

Table 3, below, shows the association relationships between Application X and each of various other applications, as determined using either the first or second techniques as described above:

TABLE 3

| Application X | |
|---|---|
| Associated application | Association relationship |
| Application A | 35% |
| Application B | 20% |
| Application C | 15% |
| Application D | 10% |
| ... | ... |

At 406, a set of application recommendation information is determined based at least in part on the association relationships between the first application and the one or more other applications.

In some embodiments, optionally, the association relationships between each application with one or more other applications (e.g., such as the association relationships shown for Application X in Table 3, above) is sent to each of the client devices. In some embodiments, the same association relationships could be sent to each client device or a subset of the association relationships could be sent to a client device in accordance with a customized, personalized scheme that is configured for the client device or as requested by the client device.

In some embodiments, applications whose association relationships to a first application satisfy a first set condition are determined to be relevant to that first application. Then, when the first application meets a second set condition, at least some of the applications that are relevant to the first application are sent to a client device as application recommendation information. The following is an example technique of determining applications to recommend to a client device based on the generated application association relationships and set conditions:

For each application, based on already determined association relationships, select at least one other application whose association relationship to that application satisfies a first set condition. In response to determining that the application in question has satisfied a second set condition, at least one of the other application(s) whose relevance (association relationship) satisfies the first set condition is included in application recommendation information that is sent to a client device.

In a specific example, for Application X, the server selects the N other applications with the highest association relationship values (i.e., satisfying a first set condition), and upon determining that the client device has already downloaded Application X (i.e., satisfying a second set condition), sends Application X and the N corresponding applications as application recommendation information to the client device, wherein N is a preset value and N≥1.

Continuing to use the example of Application X and its computed association relationships as shown in Table 3, if it is assumed that N=2, then, when it is determined that a client device has requested the download of Application X, data associated with Application X is sent to the client device together with Application A and Application B as application recommendation information to the client device because Application A and Application B have the highest association relationships to Application X.

In another example, for Application X, the server selects the M other applications whose association relationship values to that application have met a set threshold (i.e., satisfies a first set condition), and, upon determining that the client device has started that Application X (i.e., satisfies a second set condition), data associated with the Application X is sent together with the corresponding M other applications as application recommendation information to the client device, wherein M is a preset value and ≥1. Specifically, assuming that the threshold value=15%, then, when it is determined that the device has started Application X, it sends Application A, Application B, and Application C as application recommendation information for Application X to the client device because each of Application A, Application B, and Application C has an association relationship to Application X that meets the threshold of 15%.

At 408, the set of application recommendation information is sent to a recipient client device.

In some embodiments, the same application recommendation information may be sent to each client device. In some embodiments, different application recommendation information may be sent to different client devices based on each particular client device's current use needs that are determined based on each client device's requests or on the application operating status of each client device (e.g., whether a certain application is currently installed at the client device).

The application recommendation information that is sent to a client device may include one or more of the following example types of content:

Content 1: Application Descriptive Information.

For example, application descriptive information includes the application IDs (e.g., Page URIs), application download addresses, web pages corresponding to applications, etc. For example, descriptive information associated with a recommended application may be sent to a client device that has not yet downloaded the recommended application. For example, the server may receive information from each client device regarding which applications have already been installed at the client device.

Content 2: Application Service Information.

For example, application service information includes the latest recent service content specifically provided by the application, such as weather forecast information that is provided by a weather application, movie ticket recommendations that are provided by a movie ticket purchasing application, etc.

For example, application service information associated with a recommended application may be sent to a client device that has already downloaded the recommend application. For example, the server may receive information from each client device regarding which applications have already been installed at the client device.

In some embodiments, application recommendation information may be directly sent to client devices. In some embodiments, application recommendation information may first be forwarded through other servers or relay devices before it is ultimately sent/forwarded to the client devices. The recipient client devices may include at least some of those that had sent collected sets of application call request recordings to the server at step 402. If the forwarding approach is used, the server will need to notify the intermediary forwarding servers or relay devices of the association relationships.

In some embodiments, the client devices may identify an application that is recommended to the client device based on the corresponding URI. In some embodiments, the URI of each application includes an appended parameter, and, optionally, the parameter is used to indicate the portal from which the corresponding application can be downloaded.

Therefore, by uploading its local set of application call request recordings to the server, each client device is able to receive application recommendation information based on the server's analysis of the merged sets of application call request recordings.

In some embodiments, a client device that receives application recommendation information from the server presents the application recommendation information at its display screen. In some embodiments, in addition to presenting the application recommendation information, the client device is also configured to use the received application recommendation information as a basis to automatically download and install and/or preload at least one of the recommended applications. For example, the client device may use the application recommendation information to identify a recommended application that is related to an already installed local application and then download the identified recommended application. In some embodiments, prior to downloading a recommended application, a prompt is first presented at the client device to receive the user's permission to perform the download. Then, once the user selects a control associated with permitting the recommended application to be downloaded, the recommended application is downloaded to the client device, thus making it possible for the user to use the recommended application without needing to manually initiate its download. In another example, the client device may use the application recommendation information to identify a recommended application that is an already installed application and then preload that application. For example, to "preload" an application includes to launch an application but keep it executing in the background until a user selects to bring it to the foreground and/or the application receives a call request from another application. Specifically, if the application recommendation information indicates that Application A has a high association relationship to Application B, then Application A may be preloaded at the client device because Applications A and B are highly relevant to each other and it is anticipated that Application B will be making call requests to Application A.

The following describes an example of performing process 400:

Assume that the set of application call request recordings that is obtained at the server from client device A includes: Page 1 calls Page 3, Page 3 calls Page 4, and Page 1 calls Page 4.

Assume that the set of application call request recordings that is obtained at the server from client device B includes: Page 1 calls Page 3, Page 2 calls Page 5, and Page 2 calls Page 3.

Assume that the set of application call request recordings that is obtained at the server from client device C includes: Page 1 calls Page 3, Page 2 calls Page 3, Page 1 calls Page 4, and Page 5 calls Page 2.

Thus, assume that the server determines the following association relationships among the various applications using the sets of application call request recordings described above (assuming that the calling party is used as the benchmark for calculating association relationships):

Page 1: Page 1→Page 3: 60%; Page 1→Page 4: 40%;
Page 2: Page 2→Page 3: 45%; Page 2→Page 5: 50% . . . ;
Page 3: Page 3→Page 4: 10% . . . ;
Page 4: none;
Page 5: Page 5→Page 2: 100%.

Referring to the example association relationships described above, in one example, in response to an indication that client device D has started Page 1, the server sends Page 3 and Page 4 as application recommendation information to client device D (e.g., because each of Page 3 and Page 4 has an association relationship value of greater than the threshold of 15%).

Referring to the example association relationships described above, in another example, in response to an indication that client device E has requested the downloading of Page 2, the server sends Page 3 and Page 5 as application recommendation information to client device E (e.g., because each of Page 3 and Page 5 has an association relationship value of greater than the threshold of 15%).

Referring to the example association relationships described above, in yet another example, in response to an indication that client device F has requested the downloading of Page 2 and requests only a recommendation that is the one application with the highest recommendation relevance, the server sends only Page 5 as an application recommendation to client device F.

Figure 5:
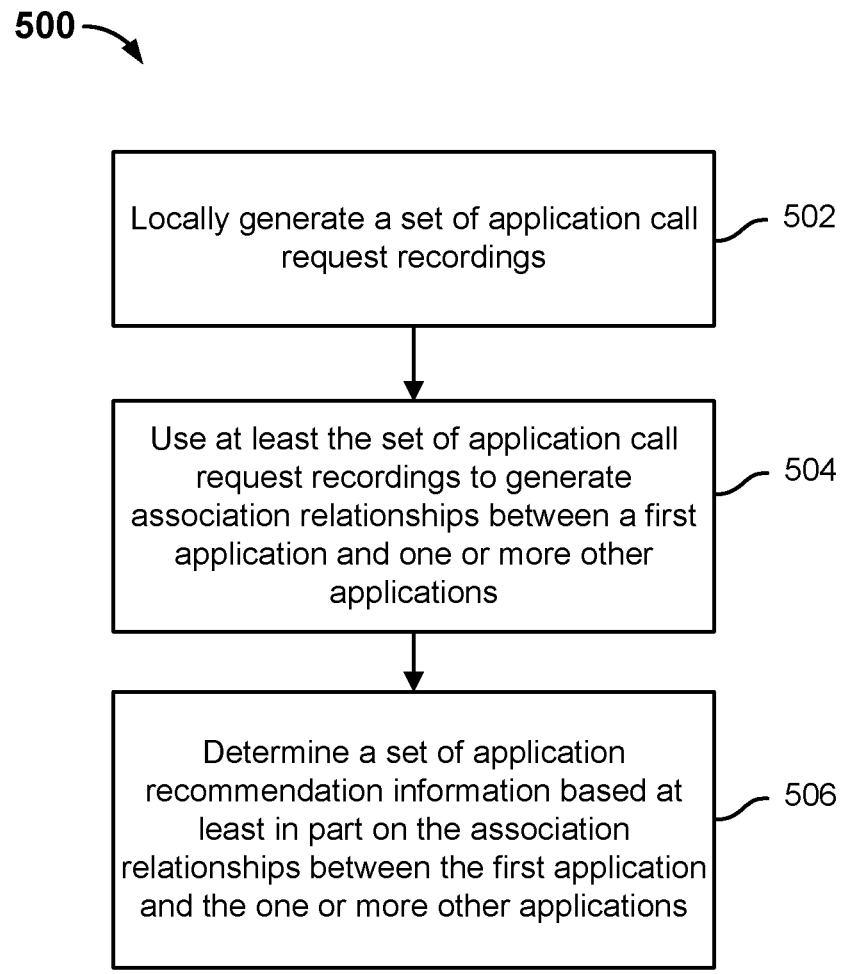
FIG. 5 is a flow diagram showing an embodiment of a process for recommending applications based on call requests between applications.

FIG. 5 is a flow diagram showing an embodiment of a process for recommending applications based on call requests between applications. In some embodiments, process 500 may be implemented at least in part by any one of client devices 206, 208, and 210 of FIG. 2.

Process 500 describes an example process in which a client device is configured to locally generate association relationships between applications and then use the association relationships to generate application recommendation information. Unlike process 400 of FIG. 4, a client device does not need to send its generated association relationships to a server for the server to generate association relationships and also application recommendation information.

At 502, a set of application call request recordings is locally generated.

For example, application call request recordings may be generated locally at a client device using steps such as steps 302 and 304 of process 300 of FIG. 3.

At 504, at least the set of application call request recordings is used to generate association relationships between a first application and one or more other applications.

In some embodiments, the client device uses just its own locally generated set of application call request recordings to generate association relationships between different applications. In some embodiments, the client device also receives one or more sets of application call request recordings that are generated by respective one or more other client devices and/or receives additional set(s) of application call request recordings from a server and then merges its locally generated set of application call request recordings with the received sets. Then, the client device can generate association relationships based on the merged sets of application call request recordings. Thus, the client device may determine personalized inter-application association relationships conforming to the user's habits based on the local application call set. It may also determine generalized application association relationships conforming to the use habits of the multiple users by combining the application call sets of multiple client devices.

The following are example techniques by which merged sets of application call request recordings may be used by a client device to determine an association relationship between one application ("Application X") and any other application ("Application A"):

First technique: The merged sets of application call request recordings is used as a basis to obtain a total number of times that Application X served as the calling party for any other Application and to obtain a total number of times that Application X served as the calling party for calling Application A, specifically. Then, the association relationship between Application X and Application A is determined based on the ratio of the total number of times that Application X served as the calling party for calling Application A to the total number of times that Application X served as the calling party for any other application.

In some embodiments, the ratio of the total number of times that Application X served as the calling party to called Application A to the total number of times that Application X served as the calling party for any other application, which is a percentage, may be directly regarded as an association relationship from Application X to Application A. The ratio value may also be multiplied by a set coefficient and then that product may be regarded as the association relationship from Application X to Application A.

Thus, it is possible to use the number of times that Application X actively calls other applications as the benchmark for determining the association relationships between Application X and each other application.

Second technique: The merged sets of application call request recordings is used as a basis to obtain a total number of times that Application X served as the called party by any other application and to obtain a total number of times that Application A has served as the calling party that had called Application X, specifically. Then, the association relationship between Application X and Application A is determined based on the ratio of the total number of times that Application A has served as the calling party that had called Application X to the total number of times that Application X served as the called party by any other application.

In some embodiments, the total number of times that Application A has served as the calling party that had called Application X to the total number of times that Application X served as the called party by any other application, which is a percentage, may be directly regarded as an association relationship from Application X to Application A. The ratio value may also be multiplied by a set coefficient and then that product may be regarded as the association relationship from Application X to Application A.

Thus, it is possible to use the number of times that Application X is actively called by other applications as the benchmark for determining the association relationships between Application X and each other application.

At 506, a set of application recommendation information is determined based at least in part on the association relationships between the first application and the one or more other applications.

For each application, based on already determined association relationships, select at least one other application whose association relationship to that application satisfies a first set condition. In response to determining that the application in question has satisfied a second set condition, the client device is configured to include that application that has satisfied the second set condition and/or at least one other application whose relevance (association relationship) satisfies the first set condition in application recommendation information. In some embodiments, the client device is configured to control the status of the application that has satisfied the second set condition and/or the status of a corresponding other application whose association relationship to the former application satisfies a first set condition. In some embodiments, "controlling the status" of an application refers to initiating an operation with respect to the application. For example, examples of "controlling the status" of an application include downloading the application (in the event that the application has not already been downloaded to the client device) or preloading the application (in the event that the application has already been downloaded to the client device).

In a specific example, for Application X, the client device selects the N other applications with the highest association relationship values (i.e., satisfying a first set condition), and upon determining that the client device has already downloaded Application X (i.e., satisfying a second set condition), sends Application X and the N corresponding applications as application recommendation information to the client device, where N is a preset value and N≥1.

Continuing to use the example of Application X and its computed association relationships as shown in Table 3, above, if it is assumed that N=2, then, when it is determined that a client device has requested the download of Application X, data associated with Application X, Application A, and Application B are included in application recommendation information to be presented at the client device because Application A and Application B have the highest association relationships to Application X.

In some embodiments, application recommendation information includes: application descriptive information (e.g., application download addresses, web pages corresponding to applications, etc.) and application service information (e.g., latest service content specifically provided by the application, such as weather forecast information, movie ticket recommendations, etc.).

In another example, for Application X, the server selects the M other applications whose association relationship values to that application have met a set threshold (i.e., satisfies a first set condition), and, upon determining that the client device has started that Application X (i.e., satisfies a second set condition), the client device is configured to control the status of application X and the corresponding M other applications, where M is a preset value and ≥1. Specifically, assuming that the threshold value=15%, then, when it is determined that the device has started Application X, the client device is configured to control the status of Application A, Application B, and Application C because each of Application A, Application B, and Application C has an association relationship to Application X that meets the threshold of 15%.

In the above embodiment, the client device may assign a URI (which needs to be consistent with the server side) corresponding to each application. In some embodiments, the URI of each application includes an appended parameter, and, optionally, the parameter is used to indicate the portal from which the corresponding application can be downloaded.

The following describes an example of performing process 500 at client device A:

Assume that the set of application call request recordings that is generated on client device A is: Page 1 calls Page 3, Page 3 calls Page 4, Page 1 calls Page 4 . . . .

Thus, assume that client device A determines the following association relationships among the various applications (assuming that the calling party is used as the benchmark for calculating association relationships):

Page 1: Page 1→Page 3: 60%; Page 1→Page 4: 40%;
    Page 2: none;
    Page 3: Page 3→Page 4; 15% . . . ;
    Page 4: none;
    Page 5: none.

Referring to the example association relationships described above:

In one example, in response to an indication that Page 1 has started at client device A, client device A may preload Page 3 and Page 4 (e.g., because each of Page 3 and Page 4 has an association relationship value of greater than the threshold of 15%). In another example, in response to an indication that client device A has downloaded Page 3, client device A may present Page 4 as application recommendation information (e.g., because Page 4 has an association relationship value of greater than the threshold of 15%).

The following is a first example that describes applying process 500 on client device A with reference to specific types of applications: the user starts the "Game Software 1" application on client device A. Client device A, by combining the sets of application call request recordings that were locally generated as well as received from one or more other client devices, determines that the majority of users use the "Plugin Software" application after starting the "Game Software 1" application. Thus, client device A presents the recommendation information for the "Plugin Software" application in response to the user initiated launch of the "Game Software 1" application at client device A.

The following is a second example that describes applying process 500 on client device A with reference to specific types of applications: the user downloads "Payment Software" onto client device A. Then client device A, by combining the sets of application call request recordings that were locally generated as well as received from one or more other client devices, determines that, after the use of "Payment Software," nearly all users initiate "Control Software," which is used to strengthen payment security. Thus, client device A presents a recommendation to download "Control Software" at the display screen and also presents a prompt that queries the user as to whether the application "Control Software" should be downloaded. Upon obtaining permission, client device A downloads "Control Software." Subsequently, the client device will always preload "Control Software" in response to the user initiating the "Payment Software" application.

The following is a third example that describes applying process 500 on client device A with reference to specific types of applications: the user starts the "Weather Forecasting Software" application on client device A. Then, client device A uses the local set of application call request recordings to determine that the user almost always launches the "Taxi Software" application after using the "Weather Forecasting Software" application. Therefore, after starting the "Weather Forecasting Software" application, client device A will preload the "Taxi Software" application.

Figure 6:
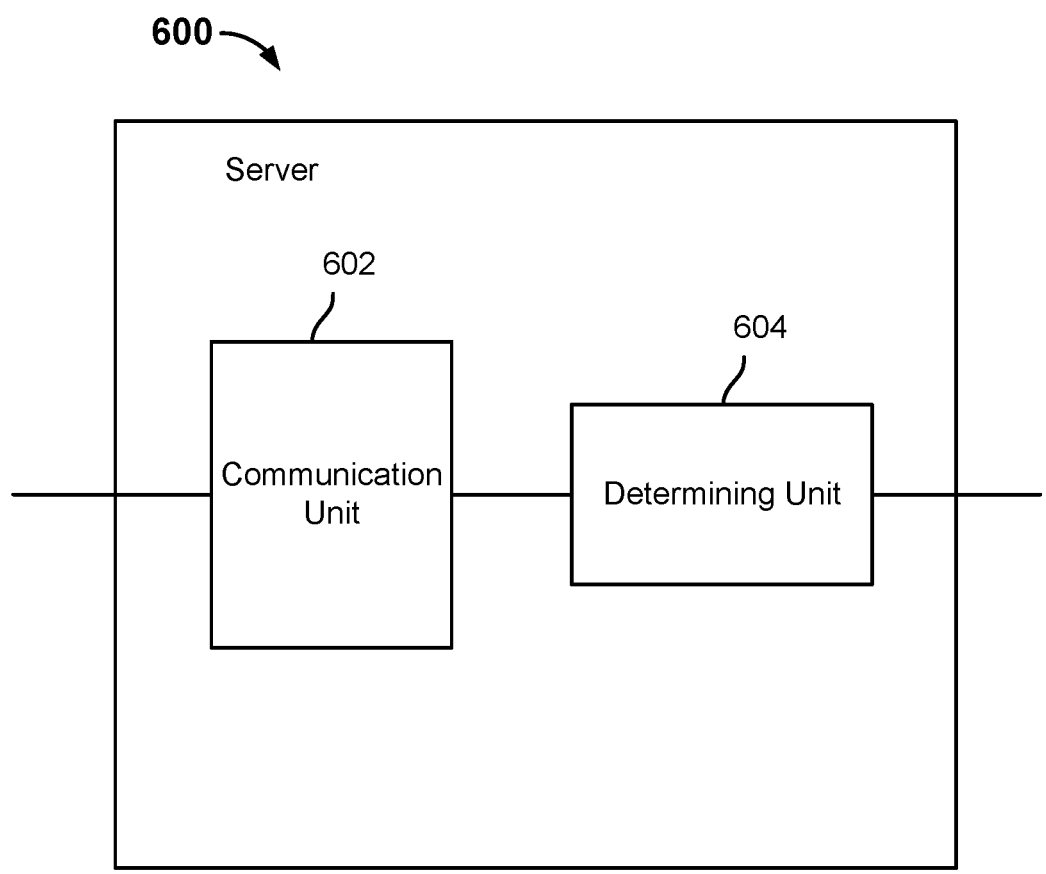
FIG. 6 is a diagram showing an embodiment of a server for recommending applications based on call requests between applications.

FIG. 6 is a diagram showing an embodiment of a server for recommending applications based on call requests between applications. In the example, server 600 includes communication unit 602 and determining unit 604. In some embodiments, process 400 of FIG. 4 may be implemented at least in part by server 600.

The units can be implemented as software components executing on one or more processors, as hardware such as programmable logic devices, and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules and sub-modules may be implemented on a single device or distributed across multiple devices.

Determining unit 604 is configured to determine association relationships between different applications based on sets of application call request recordings that are collected from various client devices. As mentioned above, an application call request recording comprises at least a calling party ID and a called party ID.

Communication unit 602 is configured to send the determined association relationships to each of various client devices. Optionally, prior to determining association relationships between different applications, determining unit 604 is further configured to receive sets of application call request recordings from various client devices through communication unit 602.

Receiving application call relationship sets reported by client devices through communication unit 602 comprises receiving sets of application call request recordings from client devices every first time interval, sending a report instruction to the client devices and receiving sets of application call request recordings from the client devices every second time interval, or sending a report instruction to client devices upon receiving an instruction and receiving sets of application call request recordings from the client devices.

In some embodiments, when receiving application call relationship sets reported by client devices, determining unit 604 is configured to receive sets of application call request recordings that are sent by multiple client devices.

Determining inter-application association relationships based on the sets of application call request recordings from determining unit 604 includes merging the sets of application call request recordings that are received from different client devices and determining association relationships based on the merged data.

In some embodiments, when sending the inter-application association relationships to client devices, communication unit 602 is configured to send the inter-application association relationships to multiple client devices.

In some embodiments, when determining inter-application association relationships based on sets of application call request recordings sent by client devices, determining unit 604 is configured to use the obtained sets of application call request recordings as a basis to determine a total number of times that a first application served as the calling party to any other application and to obtain a total number of times that the first application served as the calling party for calling a second application, specifically. Then, determining unit 604 is configured to determine the association relationship between the first application and the second application based on the ratio of the total number of times that the first application served as the calling party for calling the second application to the total number of times that the first application served as the calling party for any other application.

In some embodiments, determining unit 604 is configured to use the obtained sets of application call request recordings as a basis to determine the total number of times that the first application served as the calling party for calling the second application to the total number of times that the first application served as the calling party for any other application, which is a percentage, and may be directly regarded as an association relationship from the first application to the second application. The ratio value may also be multiplied by a set coefficient and then that product may be regarded as the association relationship from the first application to the second application.

In some embodiments, communication unit 602 is configured to send application recommendation information to client devices based on the inter-application association relationships.

In some embodiments, the application recommendation information comprises: application descriptive information and/or application service information.

In some embodiments, when sending application recommendation information to client devices based on the inter-application association relationships, communication unit 602 is configured to, for each application, use the association relationships as a basis to determine at least one other application whose relevance satisfies a first set condition. In response to an indication that the application in question has satisfied a second set condition, communication unit 602 is configured to send the set application and/or a corresponding other application whose relevance satisfies the first set condition as application recommendation information to client devices.

In some embodiments, when sending application recommendation information to client devices based on the association relationships, communication unit 602 is configured to send application recommendation information to different client devices based on the association relationships.

In some embodiments, determining unit 604 is configured to assign a corresponding URI to each application. In some embodiments, a parameter that is appended in the URI indicates a portal from which the application may be downloaded.

Figure 7:
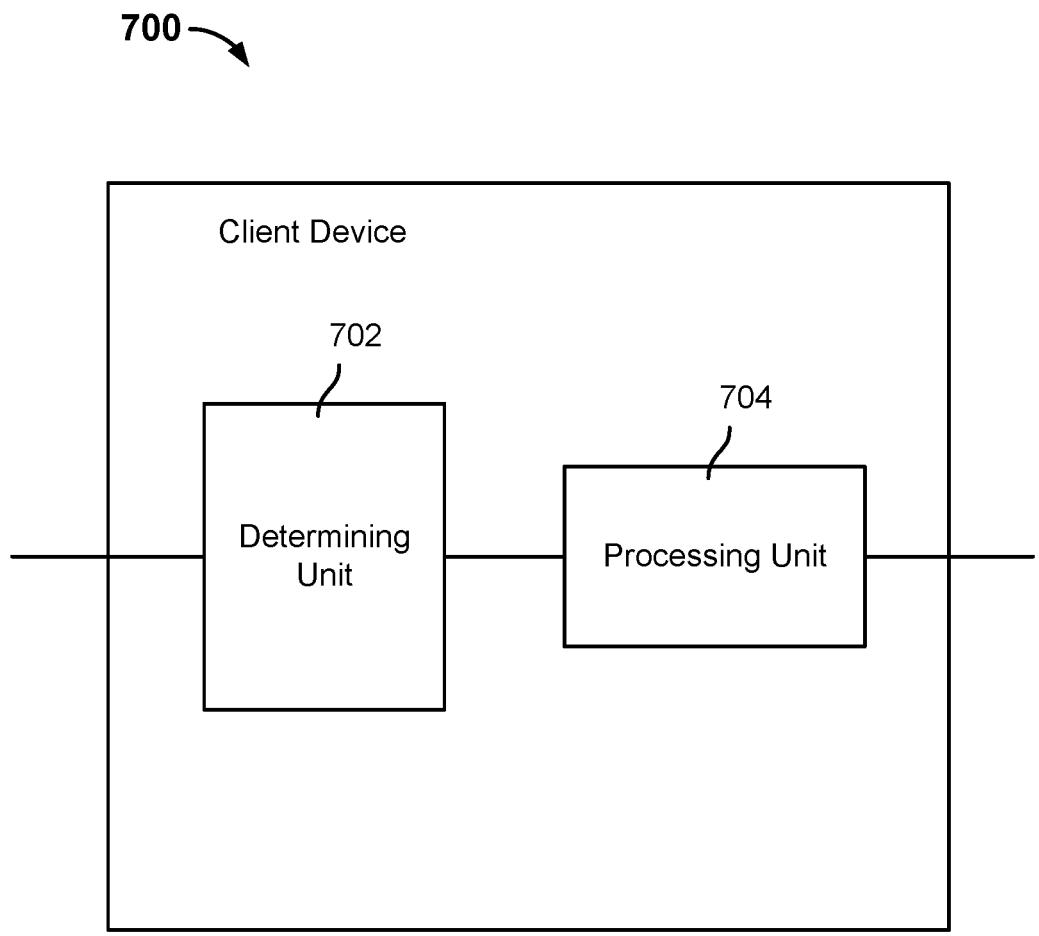
FIG. 7 is a diagram showing an embodiment of a client device for recommending applications based on call requests between applications.

FIG. 7 is a diagram showing an embodiment of a client device for recommending applications based on call requests between applications. In the example of FIG. 7, client device 700 includes determining unit 702 and processing unit 704. In some embodiments, process 500 of FIG. 5 may be implemented at least in part by client device 700.

Determining unit 702 is configured to determine association relationships between different applications based on sets of application call request recordings that are collected at client device 700. As mentioned above, an application call request recording comprises at least a calling party ID and a called party ID.

Processing unit 704 is configured to present application recommendation information or control application status based on the inter-application association relationships.

In some embodiments, determining unit 702 is configured to use a set of application call request recordings that is stored on the client device to determine the association relationships.

In some embodiments, determining unit 702 is configured to merge a set of application call request recordings that is stored at client device 700 with one or more sets of application call request recordings that are provided by a server and/or obtained from other client devices. Then, determining unit 702 is configured to use the merged sets of application call request recordings to determine the association relationships.

In some embodiments, in determining inter-application association relationships, determining unit 702 is configured to use the obtained sets of application call request recordings as a basis to determine a total number of times that a first application served as the calling party to any other application and to obtain a second total of the number of times that the first application served as the calling party for calling a second application, specifically. Then, determining unit 702 is configured to determine the association relationship between the first application and the second application based on the ratio of the total number of times that the first application served as the calling party for calling the second application to the total number of times that the first application served as the calling party for any other application.

In some embodiments, in determining inter-application association relationships, determining unit 702 is configured to use the obtained sets of application call request recordings as a basis to determine the total number of times that the first application served as the calling party for calling the second application to the total number of times that the first application served as the calling party for any other application, which is a percentage and may be directly regarded as an association relationship from the first application to the second application. The ratio value may also be multiplied by a set coefficient and then that product may be regarded as the association relationship from the first application to the second application.

In some embodiments, when pushing application recommendation information or controlling application statuses based on the inter-application association relationships, processing unit 704 is configured to, for each application, use the association relationships as a basis to determine at least one other application whose relevance (association relationship) satisfies a first set condition. In response to determining that the application in question has satisfied a second set condition, processing unit 704 is configured to include that application that has satisfied the second set condition and/or at least one other application whose relevance satisfies the first set condition in application recommendation information. In some embodiments, processing unit 704 is configured to control the status of the application that has satisfied the second set condition and/or the status of a corresponding other application whose association relationship to the former application satisfies a first set condition.

In some embodiments, the application recommendation information comprises application descriptive information and/or application service information.

In some embodiments, when controlling application status, processing unit 704 is configured to download an application or preload an application.

In some embodiments, processing unit 704 is configured to assign a corresponding URI to each application. In some embodiments, the URI of each application is appended with a parameter that is used to indicate the portal from which the application may be downloaded.

In some embodiments, when controlling application status based on the inter-application association relationships, processing unit 704 is configured to preload a second application related to the first application in response to detecting that a first application has been started based on the inter-application association relationships.

In some embodiments, when controlling application status based on the inter-application association relationships, processing unit 704 is configured to download a second application related to the first application in response to detecting that a first application has been started based on the inter-application association relationships.

In some embodiments, prior to downloading a second application related to the first application, processing unit 704 is configured to recommend to the user a second application related to the first application and determine, per the user's choice, the second application that is to be downloaded.

The units described above can be implemented as software components executing on one or more processors, as hardware components such as programmable logic devices (e.g., microprocessors, field-programmable gate arrays (FPGAs), digital signal processors (DSPs), etc.), Application Specific Integrated Circuits (ASICs) designed to perform certain functions, or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The units may be implemented on a single device or distributed across multiple devices. The functions of the units may be merged into one another or further split into multiple sub-sub-units.

Figure 8:
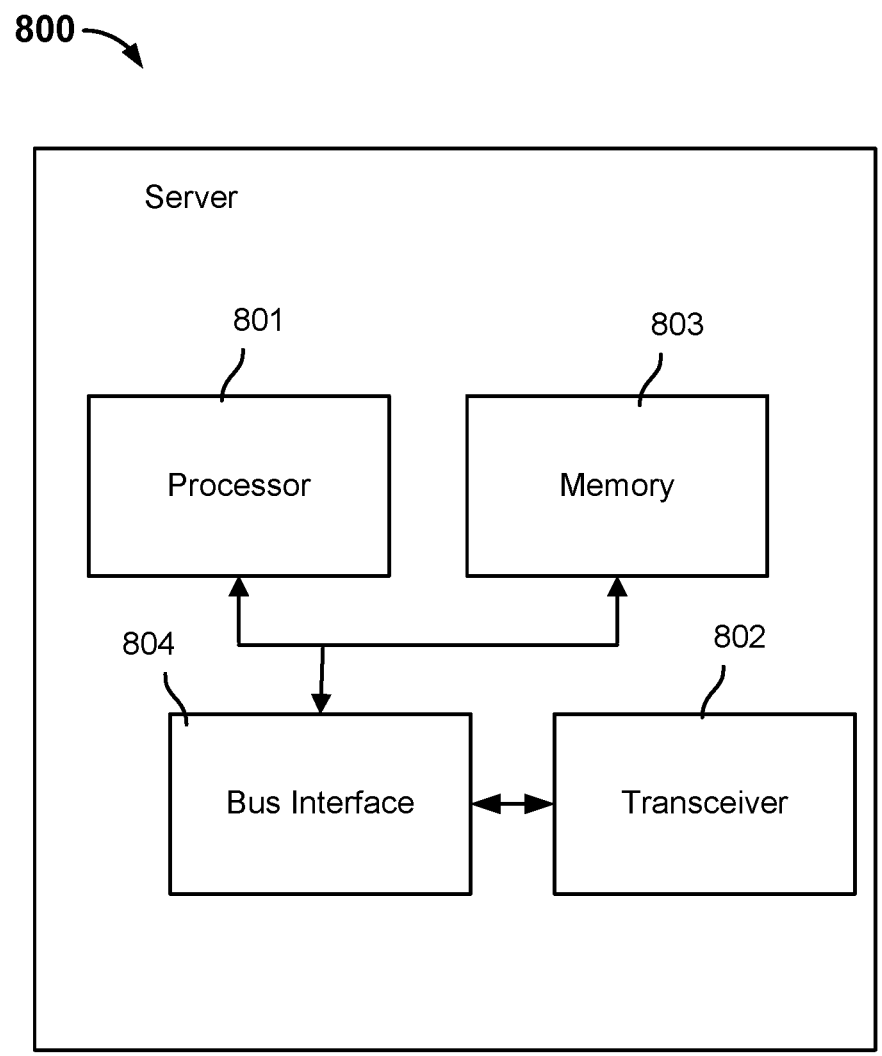
FIG. 8 is a diagram showing an embodiment of a server for recommending applications based on call requests between applications.

FIG. 8 is a diagram showing an embodiment of a server for recommending applications based on call requests between applications. In the example, server 800 includes processor 801, transceiver 802, memory 803, and bus interface 804. In some embodiments, process 400 of FIG. 4 may be implemented at least in part by server 800.

Processor 801 is for retrieving programs from memory and executing the following process through transceiver 802. Processor 801 is configured to determine inter-application association relationships based on sets of application call request recordings that are sent by client devices. As mentioned above, an application call request recording includes at least IDs for calling party applications and IDs for called party applications. Processor 801 is configured to send the determined the association relationships to the client devices.

Transceiver 802 is for receiving and sending data under the control processor 801.

In some embodiments, processor 801 is configured to receive sets of application call request recordings as sent by client devices.

Processor 801 determines inter-application association relationships based on sets of application call request recordings as sent by client devices and merges the received data sets.

In some embodiments, processor 801 sending the inter-application association relationships to client devices comprises sending the association relationships to multiple client devices.

In some embodiments, processor 801 is further configured to send application recommendation information to client devices based on the application association relationships.

Bus interface 804 may include any number of interconnected buses and bridges. Bus interface 804 links together various circuits including one or more processors represented by processor 801 and storage devices represented by the memory. Bus interface 804 may also link together various circuits such as the peripheral device, voltage stabilizer, and power management circuits. All of these are common knowledge in the art. Therefore, they will not be described any further in the present document. Transceiver 802 may be one component or multiple components, such as multiple receivers and transmitters, and provides a unit for communicating across a transmission medium with various other devices.

Processor 801 is configured to manage bus interface 804 and for general processing. Processor 801 may also provide various functions, including timing, peripheral interfacing, voltage regulation, power management, and other control functions. Memory 803 may be used to store data used by processor 801 when executing operations.

In some embodiments, processor 801 may be a central processing unit (CPU), an application specific integrated circuit (ASIC), a field-programmable gate array (FPGA), or a complex programmable logic device (CPLD).

Figure 9:
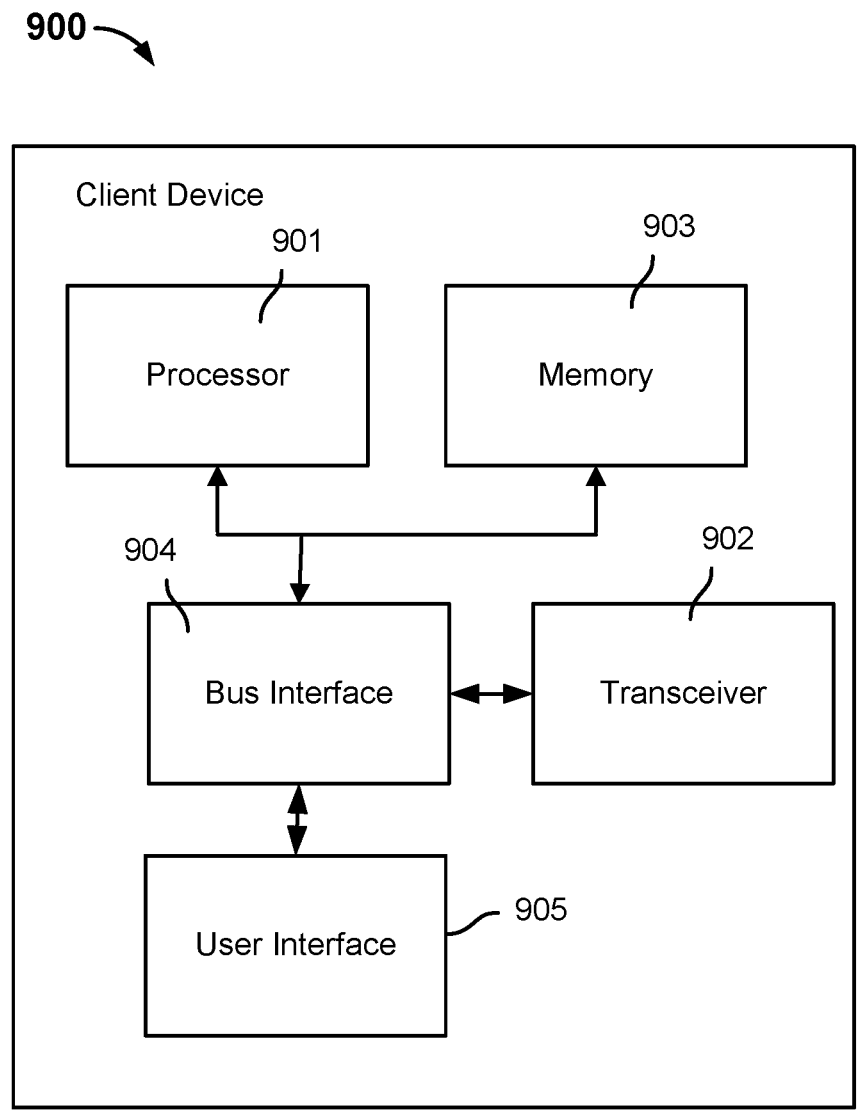
FIG. 9 is a flow diagram showing an embodiment of a system for recommending applications based on call requests between applications.

FIG. 9 is a flow diagram showing an embodiment of a system for recommending applications based on call requests between applications. In the example, system 900 includes processor 901, transceiver 902, memory 903, and bus interface 904. In some embodiments, process 500 of FIG. 5 may be implemented at least in part by system 900.

Processor 901 is configured to retrieve computer programs from memory 903 and then execute the following: locally generate a set of application call request recordings, generate association relationships between a first application and one or more other applications based on the set of application call request recordings, determine association relationships based on the at least one set of application call request recordings, and determine a set of application recommendations based at least in part on the association relationships between the first application and the one or more other applications.

Transceiver 902 is configured to send and receive data under the control of processor 901.

Processor 901 is configured to present application recommendation information at user interface 905 and/or use it to control application statuses at client device 900 in the following example way:

For a particular application, the association relationships are used as a basis to determine at least one other application whose relevance satisfies a first set condition. Then, once it's determined that the particular application has satisfied a second set condition, the status of the particular application and/or the at least one other application whose relevance has satisfied the first set condition is controlled by processor 901. As mentioned above, controlling a status of an application refers to downloading the application or preloading the application. For example, processor 901 may preload an application that is related to another application (based on the association relationships) after it is determined that the other application has been started at client device 900. In another example, processor 901 may download an application that is related to another application (based on the association relationships) after it is determined that the other application has been started at client device 900.

In some embodiments, prior to processor 901 downloading a second application related to the first application, processor 901 is further configured to recommend to the user a second application related to the first application and determine, per the user's selection, whether the second application can be downloaded.

Bus interface 904 within the bus architecture may include any number of interconnected buses and bridges. Bus interface 904 links together various circuits including one or more processors represented by processor 901 and storage devices represented by the memory. Bus interface 904 may also link together various circuits such as the peripheral device, voltage stabilizer, and power management circuits. All of these are common knowledge in the art. Therefore, they will not be described any further in the present document. Transceiver 902 may be one component or multiple components, such as multiple receivers and transmitters, and provides a unit for communicating across a transmission medium with various other devices. For example, transceiver 902 receives external data from other devices. Transceiver 902 is configured to send data after it is processed by processor 901 to other devices. While not shown in FIG. 9, client device 900 may further include a user input periphery such as a small keyboard, a display device, a speaker, a microphone, or a control rod.

Processor 901 is configured to manage bus interface 904 and for general processing, such as running the general operating system as described above. Memory 903 is configured to store data used by processor 901 when executing operations.

In some embodiments, processor 901 may be a CPU, an ASIC, an FPGA, or a CPLD.

Figure 10:
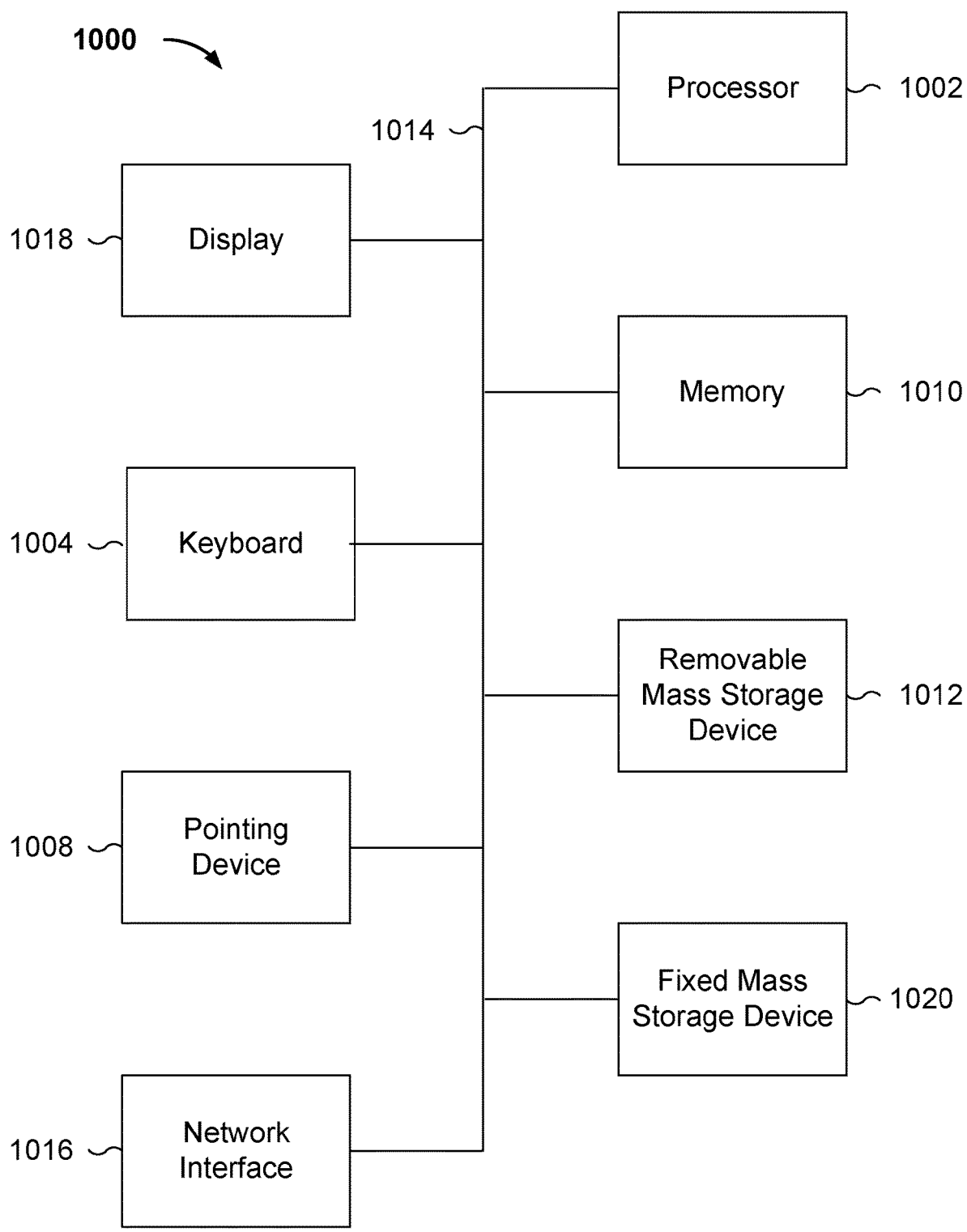
FIG. 10 is a functional diagram illustrating an embodiment of a programmed computer system for recommending applications based on call requests between applications.

FIG. 10 is a functional diagram illustrating an embodiment of a programmed computer system for recommending applications based on call requests between applications. As will be apparent, other computer system architectures and configurations can be used to recommend applications based on call requests between applications. Computer system 1000, which includes various subsystems as described below, includes at least one microprocessor subsystem (also referred to as a processor or a central processing unit (CPU)) 1002. For example, processor 1002 can be implemented by a single-chip processor or by multiple processors. In some embodiments, processor 1002 is a general purpose digital processor that controls the operation of the computer system 1000. Using instructions retrieved from memory 1010, the processor 1002 controls the reception and manipulation of input data, and the output and display of data on output devices (e.g., display 1018).

Processor 1002 is coupled bi-directionally with memory 1010, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1002. Also as is well known in the art, primary storage typically includes basic operating instructions, program code, data, and objects used by the processor 1002 to perform its functions (e.g., programmed instructions). For example, memory 1010 can include any suitable computer readable storage media, described below, depending on whether, for example, data access needs to be bi-directional or uni-directional. For example, processor 1002 can also directly and very rapidly retrieve and store frequently needed data in a cache memory (not shown).

A removable mass storage device 1012 provides additional data storage capacity for the computer system 1000 and is coupled either bi-directionally (read/write) or uni-directionally (read only) to processor 1002. For example, storage 1012 can also include computer readable media such as magnetic tape, flash memory, PC-CARDS, portable mass storage devices, holographic storage devices, and other storage devices. A fixed mass storage 1020 can also, for example, provide additional data storage capacity. The most common example of fixed mass storage 1020 is a hard disk drive. Mass storages 1012, 1020 generally store additional programming instructions, data, and the like that typically are not in active use by the processor 1002. It will be appreciated that the information retained within mass storages 1012 and 1020 can be incorporated, if needed, in standard fashion as part of memory 1010 (e.g., RAM) as virtual memory.

In addition to providing processor 1002 access to storage subsystems, bus 1014 can also be used to provide access to other subsystems and devices. As shown, these can include a display 1018, a network interface 1016, a keyboard 1004, and a pointing device 1008, as well as an auxiliary input/output device interface, a sound card, speakers, and other subsystems as needed. For example, the pointing device 1008 can be a mouse, stylus, track ball, or tablet, and is useful for interacting with a graphical user interface.

The network interface 1016 allows processor 1002 to be coupled to another computer, computer network, or telecommunications network using a network connection as shown. For example, through the network interface 1016, the processor 1002 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1002 can be used to connect the computer system 1000 to an external network and transfer data according to standard protocols. For example, various process embodiments disclosed herein can be executed on processor 1002, or can be performed across a network such as the Internet, intranet networks, or local area networks, in conjunction with a remote processor that shares a portion of the processing. Additional mass storage devices (not shown) can also be connected to processor 1002 through network interface 1016.

An auxiliary I/O device interface (not shown) can be used in conjunction with computer system 1000. The auxiliary I/O device interface can include general and customized interfaces that allow the processor 1002 to send and, more typically, receive data from other devices such as microphones, touch-sensitive displays, transducer card readers, tape readers, voice or handwriting recognizers, biometrics readers, cameras, portable mass storage devices, and other computers.

For example, computer system 1000 may comprise a smart phone or a computer. For example, memory 1010 is configured to store program instructions, and processor 1002, coupled to memory 1010, is configured to read the program instructions stored by memory 1010 and, in response, execute steps described in process 300 of FIG. 3, process 400 of FIG. 4, and process 500 of FIG. 5.

A person skilled in the art should understand that embodiments of the present application can be provided as methods, systems, or computer program products. Therefore, the present application may take the form of completely hardware embodiments, completely software embodiments, or embodiments that combine software and hardware. Moreover, the present application may take the form of computer program products implemented on one or more computer-operable storage media (including but not limited to magnetic disk storage, CD-ROMs, and optical storage) containing computer-operable program code.

The present application is described with reference to flowcharts and/or block diagrams based on methods, devices (systems), and computer program products of the embodiments of the present application. Please note that each flow process and/or block within the flowcharts and/or block diagrams and combinations of flow processes and/or blocks within the flowcharts and/or block diagrams can be implemented by computer program instructions. These computer program instructions can be provided to the processors of general-purpose computers, specialized computers, embedded processor devices, or other programmable data-processing devices to produce a machine. The instructions executed by the processors of the computers or other programmable data-processing devices consequently give rise to means for implementing the functions specified in one or more processes in the flowcharts and/or one or more blocks in the block diagrams.

These computer program instructions can also be stored in computer-readable memory that can guide computers or other programmable data-processing devices to operate according to specific modes, with the result that the instructions stored in this computer-readable memory give rise to products that include instruction means. These instruction means implement the functions specified in one or more processes in a flowchart and/or one or more blocks in a block diagram.

These computer program instructions can also be loaded onto a computer or other programmable data-processing device, with the result that a series of operating steps is executed on a computer or other programmable device so as to give rise to computer processing. In this way, the instructions executed on a computer or other programmable device provide steps for implementing the functions specified by one or more processes in a flowchart and/or one or more blocks in a block diagram.

Although preferred embodiments of the present application have already been described, persons skilled in the art can make other modifications or revisions to these embodiments once they grasp the basic creative concept. Therefore, the attached claims are to be interpreted as including the preferred embodiments as well as all modifications and revisions falling within the scope of the embodiments of the present application.

Obviously, a person skilled in the art can modify and vary the present application without departing from the spirit and scope of the present application. Thus, if these modifications to and variations of embodiments of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a plurality of sets of application call request recordings from respective ones of a plurality of client devices, wherein an application call request comprises a PageLink including a calling party identifier and a called party identifier;
use the plurality of sets of application call request recordings to generate association relationships between a first application and one or more other applications, wherein to use the plurality of sets of application call request recordings to generate the association relationships between the first application and the one or more other applications includes to:
obtain from the plurality of sets of application call request recordings a total number of times that the first application has served as a called party by any other application;
obtain from the plurality of sets of application call request recordings a total number of times that the first application has served as the called party by a second application; and
determine an association relationship value between the first application and the second application as a ratio of the total number of times that the first application has served as the called party by the second application to the total number of times that the first application has served as the called party by any other application;
determine a set of application recommendation information determined based at least in part on the association relationships between the first application and the one or more other applications; and
send the set of application recommendation information to a recipient client device, wherein application recommendation information corresponding to a recommended application comprises latest recent service content specifically provided by the recommended application; and
a memory coupled to the processor and configured to provide the processor with instructions.

2. The system of claim 1, wherein the processor is further configured to:
receive a high-level instruction; and
in response to the high-level instruction, send a report instruction to the plurality of client devices to cause the plurality of client devices to send the plurality of sets of application call request recordings.

3. The system of claim 1, wherein to determine the set of application recommendation information determined based at least in part on the association relationships between the first application and the one or more other applications includes to:
use the association relationships to determine a set of applications whose corresponding association relationship values corresponding to the first application satisfy a first set condition; and
receive an indication of a satisfaction of a second set condition, and include the set of applications into the set of application recommendation information.

4. The system of claim 3, wherein the second set condition comprises an initiation of the first application at the recipient client device.

5. The system of claim 1, wherein the recipient client device is configured to present a prompt associated with downloading the recommended application that is included in the set of application recommendation information or preload the recommended application that is included in the set of application recommendation information in the event that the recommended application has already been downloaded to the recipient client device.

6. A method, comprising:
receiving a plurality of sets of application call request recordings from respective ones of a plurality of client devices, wherein an application call request comprises a PageLink including a calling party identifier and a called party identifier;
using the plurality of sets of application call request recordings to generate association relationships between a first application and one or more other applications, wherein using the plurality of sets of application call request recordings to generate the association relationships between the first application and the one or more other applications includes:
obtaining from the plurality of sets of application call request recordings a total number of times that the first application has served as a called party by any other application;
obtaining from the plurality of sets of application call request recordings a total number of times that the first application has served as the called party by a second application; and
determining an association relationship value between the first application and the second application as a ratio of the total number of times that the first application has served as the called party by the second application to the total number of times that the first application has served as the called party by any other application;

determining a set of application recommendation information determined based at least in part on the association relationships between the first application and the one or more other applications; and sending the set of application recommendation information to a recipient client device, wherein application recommendation information corresponding to a recommended application comprises latest recent service content specifically provided by the recommended application.

7. The method of claim 6, further comprising:

receiving a high-level instruction; and in response to the high-level instruction, sending a report instruction to the plurality of client devices to cause the plurality of client devices to send the plurality of sets of application call request recordings.

8. The method of claim 6, wherein determining the set of application recommendation information determined based at least in part on the association relationships between the first application and the one or more other applications includes:

using the association relationships to determine a set of applications whose corresponding association relationship values corresponding to the first application satisfy a first set condition; and receiving an indication of a satisfaction of a second set condition, and include the set of applications into the set of application recommendation information.

9. The method of claim 6, wherein the recipient client device is configured to present a prompt associated with downloading the recommended application that is included in the set of application recommendation information or preload the recommended application that is included in the set of application recommendation information in the event that the recommended application has already been downloaded to the recipient client device.

10. A client device, comprising:

a processor configured to:

locally generate a set of application call request recordings, wherein an application call request comprises a PageLink including a calling party identifier and a called party identifier;

use at least the set of application call request recordings to generate association relationships between a first application and one or more other applications, wherein to use at least the set of application call request recordings to generate the association relationships between the first application and the one or more other applications includes to:

obtain from the plurality of sets of application call request recordings a total number of times that the first application has served as a called party by any other application;

obtain from the plurality of sets of application call request recordings a total number of times that the first application has served as the called party by a second application; and determine an association relationship value between the first application and the second application as a ratio of the total number of times that the first application has served as the called party by the second application to the total number of times that the first application has served as the called party by any other application; and determine a set of application recommendation information based at least in part on the association relationships between the first application and the one or more other applications, wherein application recommendation information corresponding to a recommended application comprises latest recent service content specifically provided by the recommended application; and a memory coupled to the processor and configured to provide the processor with instructions.

11. The client device of claim 10, wherein to determine the set of application recommendation information based at least in part on the association relationships between the first application and the one or more other applications includes to:

use the association relationships to determine a set of applications whose corresponding association relationship values corresponding to the first application satisfy a first set condition; and receive an indication of a satisfaction of a second set condition, and include the set of applications into the set of application recommendation information.

\* \* \* \* \*